United States Patent
Harder et al.

(10) Patent No.: US 11,726,335 B2
(45) Date of Patent: Aug. 15, 2023

(54) HEAD-MOUNTABLE DEVICE WITH OPTICAL ALIGNMENT

(71) Applicant: Apple Inc., Cupertino, CA (US)

(72) Inventors: Cameron A. Harder, San Francisco, CA (US); David A. Kalinowski, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 16/908,549

(22) Filed: Jun. 22, 2020

(65) Prior Publication Data

US 2021/0026147 A1    Jan. 28, 2021

Related U.S. Application Data

(60) Provisional application No. 62/877,247, filed on Jul. 22, 2019.

(51) Int. Cl.
*G02B 27/01* (2006.01)
*G09G 3/00* (2006.01)

(52) U.S. Cl.
CPC ......... *G02B 27/0176* (2013.01); *G09G 3/001* (2013.01); *G02B 2027/0159* (2013.01); *G02B 2027/0178* (2013.01)

(58) Field of Classification Search
CPC ........ G02B 27/0176; G02B 2027/0159; G02B 2027/0178; G09G 3/001
See application file for complete search history.

(56) References Cited

U.S. PATENT DOCUMENTS

| | | | |
|---|---|---|---|
| 6,701,043 B2 | 3/2004 | Delisle et al. | |
| 2014/0266987 A1 | 9/2014 | Magyari | |
| 2016/0048025 A1* | 2/2016 | Cazalet | G02B 27/0176 351/116 |
| 2016/0207457 A1 | 7/2016 | Border et al. | |
| 2020/0278544 A1* | 9/2020 | Poulad | G02B 27/18 |
| 2020/0371357 A1 | 11/2020 | Choi | |
| 2020/0394456 A1* | 12/2020 | Boulanger | G06F 3/0346 |

* cited by examiner

*Primary Examiner* — Kwang-Su Yang
(74) *Attorney, Agent, or Firm* — BakerHostetler

(57) ABSTRACT

Head-mountable devices can include adjustment mechanisms to achieve optimal alignment of optical components during and/or after assembly thereof within the head-mountable device. The alignment mechanisms can be integrated into the head-mountable device itself. A light projecting display element can be adjustable based on movement of ramp members within the head-mountable device (e.g., within an arm) to adjust an orientation of the light projecting display element relative to the waveguide onto which it projects light. Alignment can be verified based on the optical output of the display element. The adjustment mechanisms can adjust the display element during initial assembly and/or be operated by actuators that actively adjust the alignment as needed over time.

20 Claims, 4 Drawing Sheets

HEAD-MOUNTABLE DEVICE WITH OPTICAL ALIGNMENT

CROSS-REFERENCE TO RELATED APPLICATION

This application claims the benefit of U.S. Provisional Application No. 62/877,247, entitled "OPTICAL ALIGNMENT FOR HEAD-MOUNTABLE DEVICE," filed Jul. 22, 2019, the entirety of which is incorporated herein by reference.

TECHNICAL FIELD

The present description relates generally to head-mountable devices, and, more particularly, to an alignment mechanism for an optical assembly of head-mountable devices, such as eyeglasses.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
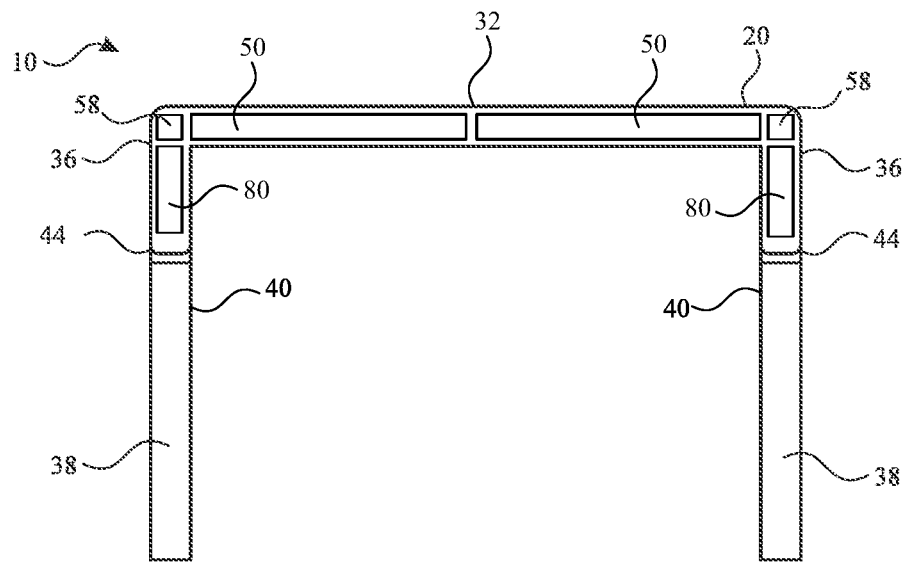
FIG. 1 illustrates a perspective view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as smart eyeglasses, head-mountable displays, headsets, visors, head-up display, and the like can perform a range of functions that is determined by the components (e.g., sensors, circuitry, and other hardware) included with the wearable device as manufactured. It can be desirable to provide the components of the head-mountable device in an alignment that provides the desired optical properties, including properly aligned output of visual features from a display element.

Proper operation of display components of a head-mountable device can be based on proper alignment. For example, where a light projection display element is configured to project light onto a waveguide, the relative alignment of the display element and the waveguide are preferably achieved for optimal performance. Misalignment of the components can cause visual features output by the display element to be projected on the waveguide at locations other than the desired locations. While such misalignment can be accommodated by shifting the output of the display element (e.g., by shifting visual features based on a known offset), such measures may require that certain output regions of the display element be sacrificed. Accordingly, the entire display capabilities of the display element may not be utilized.

During assembly of a head-mountable device, the display element can be arranged with respect to the waveguide to achieve optimal alignment. Individual components can each have different manufacturing tolerances that yield a range of different alignment possibilities. Given such a range of possible misalignments, it can be desirable to have an ability to align the components relative to each other during and/or after assembly within the head-mountable device.

Head-mountable devices of the present disclosure can provide adjustment mechanisms to achieve optimal alignment of optical components during and/or after assembly thereof within the head-mountable device. The alignment mechanisms can be integrated into the head-mountable device itself. A light projecting display element can be adjustable based on movement of ramp members within the head-mountable device (e.g., within an arm) to adjust an orientation of the light projecting display element relative to the waveguide onto which it projects light. Alignment can be verified based on the optical output of the display element. The adjustment mechanisms can adjust the display element during initial assembly and/or be operated by actuators that actively adjust the alignment as needed over time.

These and other embodiments are discussed below with reference to FIGS. 1-7. However, those skilled in the art will readily appreciate that the detailed description given herein with respect to these Figures is for explanatory purposes only and should not be construed as limiting.

According to some embodiments, for example as shown in FIG. 1, a head-mountable device 10 includes a frame 20 that is worn on a head with one or more arms 40. The frame 20 can be positioned in front of the eyes of a user to provide information within a field of view of the user. The frame 20 can provide nose pads 34 or another feature to rest on a user's nose. The frame 20 further includes one or more optical modules 50 and a bridge 32 above the nose pads 34 and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

An optical module 50 can transmit light from a physical environment for viewing by the user. Such an optical module 50 can include optical properties, such lenses for vision correction based on incoming light from the physical environment. Additionally or alternatively, an optical module 50 can provide information as a display within a field of view of the user. Such information can be displayed based on operation of a display element 80 that projects light onto and/or communicates with one or more elements of the optical module 50. As shown in FIG. 1, the display element 80 can reside, at least partially, in one or more of the arms 40 and/or in the frame 20. For example, the display element 80 can reside, at least partially, within a cavity 42 extending from the frame 20 and into the arm 40. Displayed information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame 20 can be supported on a user's head with the arms 40. The arms 40 can wrap or extend along opposing sides of a user's head, as with temple components 36. The arms 40 can further include earpieces 38 for wrapping around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40, including the temple components 36 and/or the earpieces 38. For example, a continuous support structure including the frame 20 can support the optical modules 50 as well as the display elements 80. While at least a portion of the arms 40 can optionally move (e.g., the earpieces 38 pivot about a hinge 44 and relative to the temple components 36) with respect to the frame 20, it will be understood that, in at least some embodiments, the frame 20 and/or the arms 40 can form a continuous structure that supports both the optical modules 50 as well as the display elements 80 to facilitate relative alignment of the optical modules 50 and their corresponding display element 80. As such, the arms 40 can refer to at least a portion of the support structure (e.g., temple components 36) that extends away from the portion of the frame 20 and that supports the optical modules 50.

In some embodiments, each of the optical modules 50 can include the display element 80 (e.g., a light projector) and a waveguide. The display element 80 can include any and all components for projecting light in the desired manner. For example, the display element 80 can include light sources, such as an RGB module, polarizers, beam splitters, collimators, lenses, and the like. The optical modules 50 can include a waveguide that allows internal reflections of received light, as well as one or more other optical components, such as corrective lenses.

The optical module 50 can include a target element 58 for calibrating the display element 80. For example, the display element 80 can project light onto the target element 58. Based on a known output of the display element 80, the alignment of the display element 80 relative to the optical module 50 (e.g., waveguide) can be detected based on the appearance of the light with respect to the target element 58. Appropriate adjustments can be performed as discussed further herein. The target element 58 can be a pattern or other visual feature on any component of the optical module 50, including the waveguide.

Figure 2:
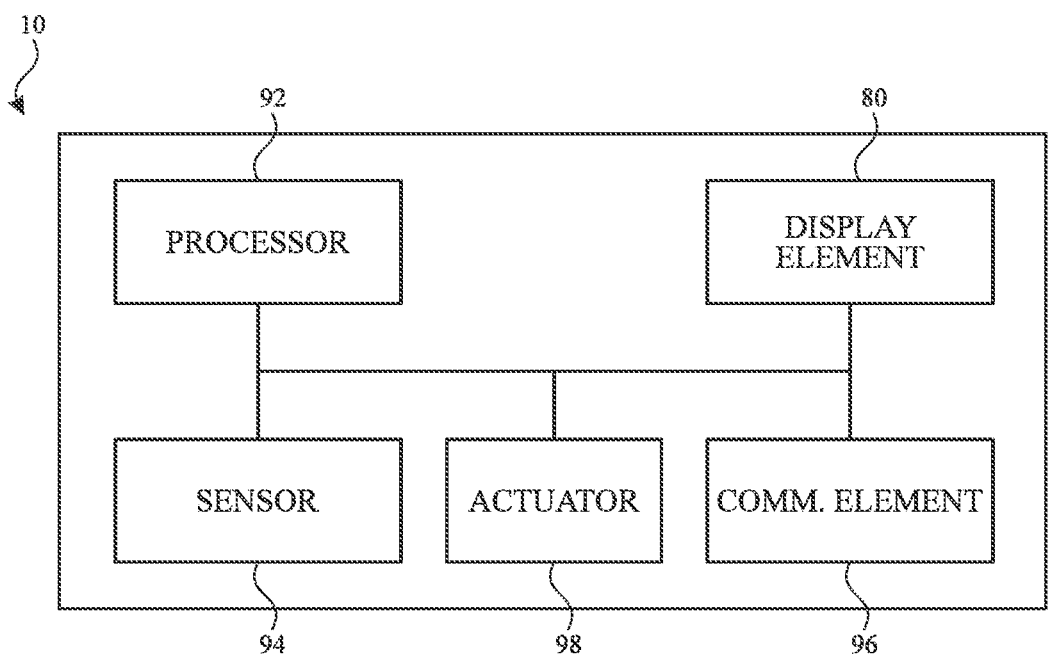
FIG. 2 illustrates a block diagram of a head-mountable device, in accordance with some embodiments of the present disclosure.

Referring now to FIG. 2, components of the head-mountable device can be provided and operatively connected to achieve the performance described herein. FIG. 2 shows a simplified block diagram of a head-mountable device 10 in accordance with one or more embodiments of the disclosure. It will be appreciated that components described herein can be provided on either or both of a frame and/or one or more arms of the head-mountable device 10.

As shown in FIG. 2, the head-mountable device 10 can include a processor 92 with one or more processing units that include or are configured to access a memory having instructions stored thereon. The instructions or computer programs may be configured to perform one or more of the operations or functions described with respect to the head-mountable device 10. The processor 92 can be implemented as any electronic device capable of processing, receiving, or transmitting data or instructions. For example, the processor 92 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The head-mountable device 10 can further include a display element 80 for displaying visual information for a user. The display element 80 can provide visual (e.g., image or video) output. The display element 80 can be or include an opaque, transparent, and/or translucent display. The display element 80 may have a transparent or translucent medium through which light representative of images is directed to a user's eyes. The display element 80 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 80 for close up viewing. The optical subassembly can include one or more lenses, mirrors, or other optical devices, as discussed further herein.

The head-mountable device 10 can include one or more sensors 94. The sensor 94 can be or include a camera for capturing a view of an environment external to the head-mountable device 10. The camera can include an optical sensor, such as a photodiode or a photodiode array, a charge-coupled device (CCD) and/or a complementary metal-oxide-semiconductor (CMOS) device, a photovoltaic cell, a photo resistive component, a laser scanner, and the like. The camera may be configured to capture an image of a scene or subject located within a field of view of the camera.

Additionally or alternatively, the sensor 94 can be a camera or another sensor configured to detect a projection of light from the display element 80 with respect to a target element of an optical module. As discussed herein, the display element 80 can project light onto a waveguide or another component, and a portion of the light can be projected onto the target element. The sensor 94 can optically or otherwise detect the location of the project light with respect to the target element to facilitate calibration and adjustment of the display element 80 with respect to the waveguide.

Additionally or alternatively, the sensor 94 can be or include one or more environment sensors that are directed to an external environment. Such environment sensors can include any sensor that detects one or more conditions in an environment of the head-mountable device 10. For example, an environment sensor 160 can include an imaging device, a thermal sensor, a proximity sensor, a motion sensor, a humidity sensor, a chemical sensor, a light sensor, a magnetometer, a gyroscope, an accelerometer, a global positioning sensor, a tilt sensor, and/or a UV sensor. An environment sensor can be configured to sense substantially any type of characteristic such as, but not limited to, images, pressure, light, touch, force, temperature, position, motion, and so on.

Additionally or alternatively, the sensor 94 can be or include one or more user sensors for tracking features of the user wearing the head-mountable device 10. For example, a user sensor can perform facial feature detection, facial movement detection, facial recognition, eye tracking, user mood detection, user emotion detection, voice detection, etc. Such eye tracking may be used to determine a location of information to be displayed by the display element 80 and/or a portion (e.g., object) of a view to be analyzed by the head-mountable device 10. By further example, the user sensor can be a bio-sensor for tracking biometric characteristics, such as health and activity metrics.

The head-mountable device 10 can include one or more actuators 98. The actuators 98 can be connected to adjustment elements and/or other components of the head-mountable device 10 to move such components as desired. The actuators 98 can be operated based on commands from the processor 92 and/or based on detections by the sensor 94, as discussed further herein. The actuators 98 can include or be connected to motors, hydraulic actuators, pneumatic actuators, magnetic actuators, piezoelectric actuators, electroactive materials, stepper motors, shape-memory alloys, and the like, as well as drivetrain components such as gears, clutches, and/or transmissions, to facilitate independent or simultaneous movement of adjustment elements based on operation of corresponding actuators 98.

The head-mountable device 10 can include a communication element 96 for communicating with one or more servers or other devices using any suitable communications protocol. For example, the communication element 96 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 96 can also include an antenna for transmitting and receiving electromagnetic signals.

The head-mountable device 10 can include one or more other components for supporting operations thereof. For example, the head-mountable device 10 can include a battery (not shown), which can charge and/or power components of the head-mountable device 10. The battery can also charge and/or power components connected to the head-mountable device 10. By further example, the head-mountable device 10 can include an input/output component (not shown), which can include any suitable component for allowing a user to provide input and/or receive output. The input/output component can include, for example, one or more buttons, crowns, keys, dials, trackpads, microphones, speakers, haptic devices, and the like.

Figure 3:
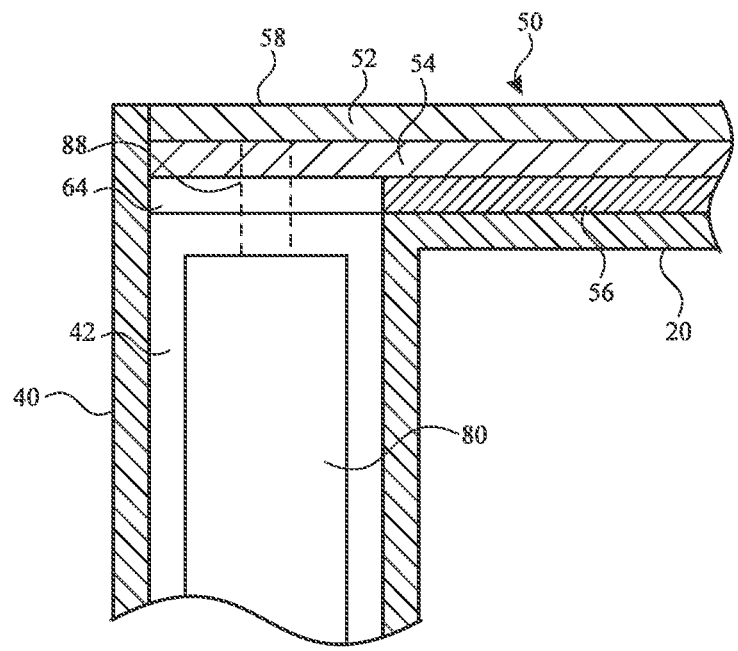
FIG. 3 illustrates a sectional view of a portion of the head-mountable device of FIG. 1, according to some embodiments of the present disclosure.

Referring now to FIG. 3, a head-mountable device can include an optical module that provides a view to an external environment and receives light from a display element for presentation to a user.

As shown in FIG. 3, an optical module 50 can include a waveguide 54 between an inner lens 56 and an outer lens 52. The inner lens 56 can be positioned on a user side of the optical module 50 (e.g., facing toward the user when the head-mountable device is worn), and the outer lens 52 can be positioned on a world side of the optical module 50 (e.g., facing away from the user when the head-mountable device is worn). The waveguide 54 can receive light 88 from the display element 80, as discussed further herein. The inner lens 56 can provide a window 64 or other structure for transmitting light from the display element 80, through the inner lens 56, and to the waveguide 54.

Figure 4:
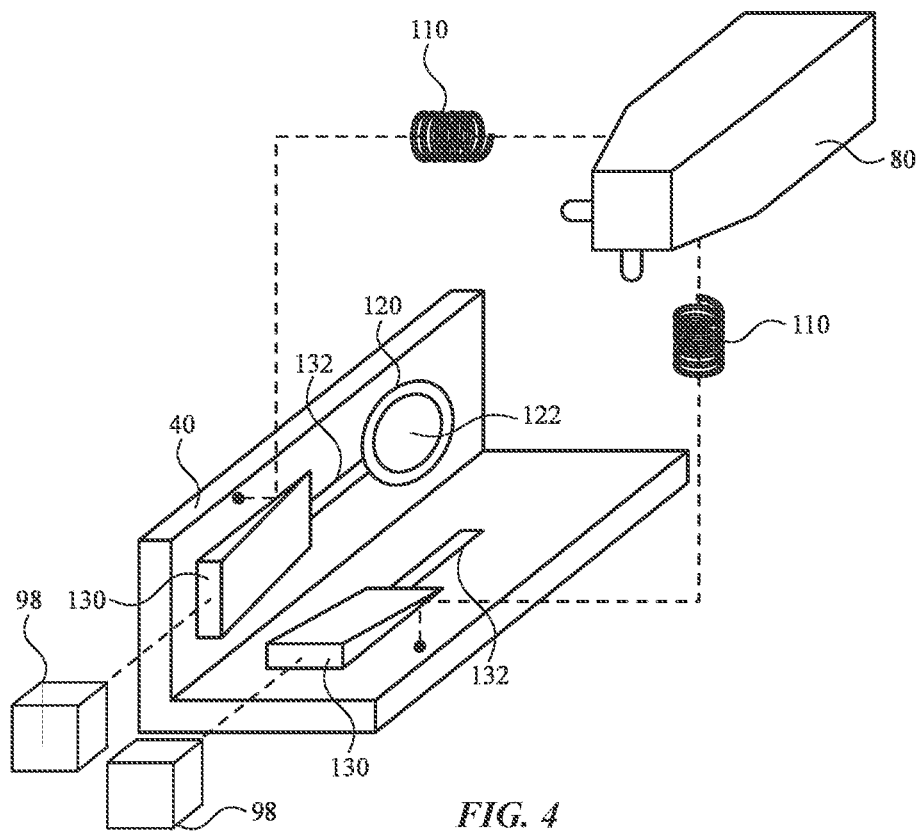
FIG. 4 illustrates an exploded perspective view of an optical assembly of a head-mountable device, according to some embodiments of the present disclosure.

The waveguide 54 can be provided with one or more features for transmitting light from the display element 80 to the user. For example, the waveguide 54 can include reflective surfaces. When the light 88 from the display element 80 enters the waveguide 54, it can strike a first surface with an angle of incidence greater than the critical angle above which total internal reflection occurs. The light 88 may engage in total internal reflection and bounce between opposing surfaces until it reaches a viewing area. At the viewing area, the light 88 can exit the waveguide 54 (e.g., at an angle less than the critical angle). While the waveguide 54 of FIG. 4 is shown as generally rectilinear, it will be understood that a variety of shapes and sizes can be provided to achieve the results discussed herein.

The inner lens 56 can apply optical effects to light transmitted from the waveguide 54 and to the user. For example, the inner lens 56 can be a negative or diverging lens. A given beam of light from the waveguide 54, after passing through the inner lens 56, can appear to emanate from a particular point beyond the inner lens 56 and/or the optical module 50 (e.g., from the external environment).

The outer lens 52 can also apply optical effects to light transmitted from an external environment and to the user. It will be recognized that, where the light from the waveguide 54 is superimposed on a view of an external environment, the inner lens 56 can apply an effect to both light from the waveguide 54 and the light from the external environment. While the effect of the inner lens 56 on the light from the waveguide 54 can be desirable, it can also be desirable to deliver light from the external environment with no net optical effect or with a different optical effect than would be provided by the inner lens 56 alone. As such, the outer lens 52 can apply an optical effect that negates, offsets, complements, or otherwise alters the effect of the inner lens 56 on incoming light from the external environment. For example, the outer lens 52 can be a positive or converging lens. A given beam of light from the external environment can pass through the outer lens 52 and receive a first optical effect. The same beam of light can further pass through the waveguide 54 and the inner lens 56 to arrive at the eye of the user with the intended optical effect.

It will be understood that the components of the optical module 50 can provide vision correction to incoming light as appropriate for a given user, for example, with the outer lens 52 and/or the inner lens 56. Such correction can be spherical, aspheric, atoric, cylindrical, single vision, multifocal, progressive, and/or adjustable. It will be understood that the components of the optical module 50 can include other optical components as required to produce a desired optical effect. For example, the outer lens 52, the waveguide 54, the inner lens 56, and/or another optical component can include one or more diffusers, filters, polarizers, prisms, beam splitters, diffraction gratings, mirrors, and/or windows. Such components can be positioned at any location adjacent to, within, or outside of the other components of the optical module 50.

The inner lens 56 and/or the outer lens 52 can be coupled (e.g., bonded) to each other and/or the frame 20. The waveguide 54 can be coupled (e.g., bonded) to the inner lens 56, the outer lens 52, and/or the frame 20. Such couplings and/or bonds can include any secure mechanism, including but not limited to adhesive, welds, interference fits, fasteners, and/or combinations thereof. Such a bond can be positioned on an inner (i.e., user side) surface, an outer (i.e., world side) surface, and/or a radial surface (i.e., connecting the inner surface and outer surface) of the inner lens 56, the outer lens 52, and/or the waveguide 54.

As further shown in FIG. 3, at least some components (e.g., display element 80) of the optical module 50 can be positioned within the cavity 42 of the corresponding arm 40. The alignment of the display element 80 within the cavity 42 can determine the direction of the beam of light 88 that is projected from the display element 80 and onto the waveguide 54. Accordingly, the display element 80 can be aligned within the cavity 42 to provide the desired visual output on the waveguide 54.

Referring now to FIG. 4, a display element can be provided with adjustment mechanisms for controlling an orientation of the display element within the head mountable device, thereby controlling the direction of a beam of projected light output by the display element.

As shown in FIG. 4, the display element 80 is coupled to the arm 40 of the head mountable device in a manner that supports the position of the display element 80 and allows for adjustable orientations thereof. While the display element 80 is shown with respect to the arm 40, it will be understood that the display element 80 can be adjustably coupled to any portion of a head mountable device, including a frame or other support structure. Additionally or alternatively, the display element 80 can be coupled to the arm 40 by an intervening structure, such as a carriage, chassis, or tray that is insertable into a cavity of the arm 40. As such, reference to an ability to adjust the display element 80 will be understood to be with respect to any structure to which the display element 80 is or can be coupled.

The display element 80 can be coupled to the arm 40 by a joint 122 that provides rotational movement of the display element 80. For example, the joint 122 can be or include a ball joint that allows the display element 80 to rotate with one or more (e.g., at least two) degrees of freedom while supporting at least a portion of the display element 80 in a given position. The joint 122 can engage the display element 80 with a support structure 120 that can optionally be provided to enhance engagement between the joint 122 and the display element 80.

The display element 80 can be engaged by one or more ramp members 130. The ramp members 130 can move relative to the arm 40 to urge a portion of the display element 80 and adjust its orientation. For example, each of the ramp members 130 can slide (e.g., linearly) along a track 132. By moving the ramp members 130, a different portion thereof may contact the display element 80, thereby urging it to a particular orientation, as discussed further herein. Each of the ramp members 130 can be moved or otherwise operated independently or in unison. Such operation can be manually, by an external device, and/or by a corresponding actuator 98 that is integrated into the head-mountable device (e.g., within the cavity of the arm 40).

Movement of each of the ramp members 130 can urge the display element 80 to rotate about a different axis. For example, the axes of rotation can be through the same portion of the display element 80. By further example, the axes of rotation can be orthogonal to each other. At least one of the axes of rotation can optionally be through the joint 122.

The display element 80 can be biased against the one or more ramp members 130 by one or more spring elements 110. Each of the spring elements 110 can couple the display element 80 to the arm 40 and/or another structure. While the spring elements 110 of FIG. 4 are shown between the display element 80 in the arm 40, it will be understood that the spring elements 110 can be provided at any position and have any type of bias to urge the display element 80 as desired. For example, the spring elements 110 can include a compression spring, an extension spring, a torsion spring, a constant force spring, and the like. While one spring element 110 is shown for each ramp member 130, it will be understood that any number of spring elements 110 can be provided.

Figure 5:
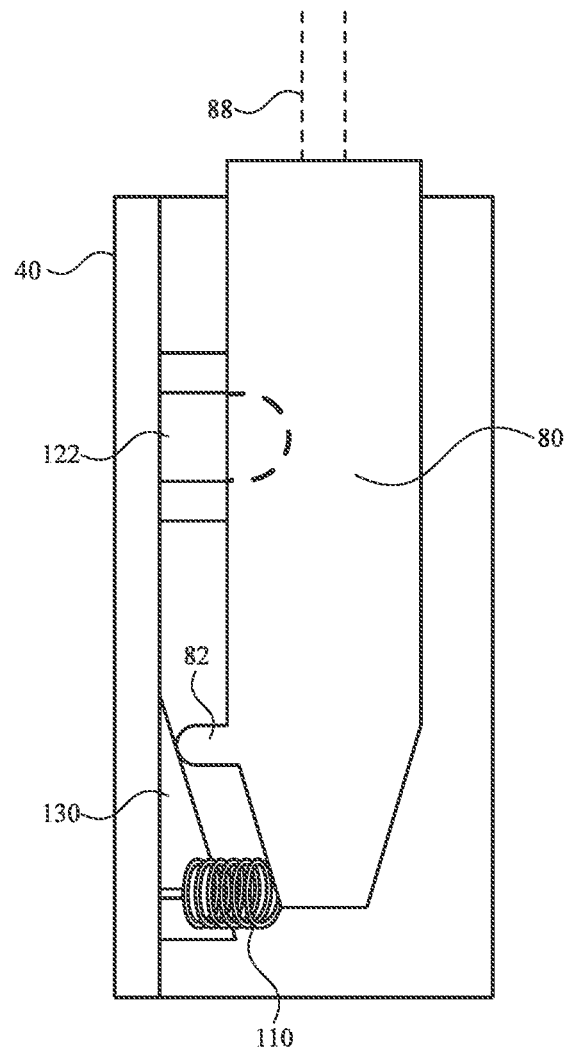
FIG. 5 illustrates a top view of the optical assembly of FIG. 4, according to some embodiments of the present disclosure.
Figure 6:
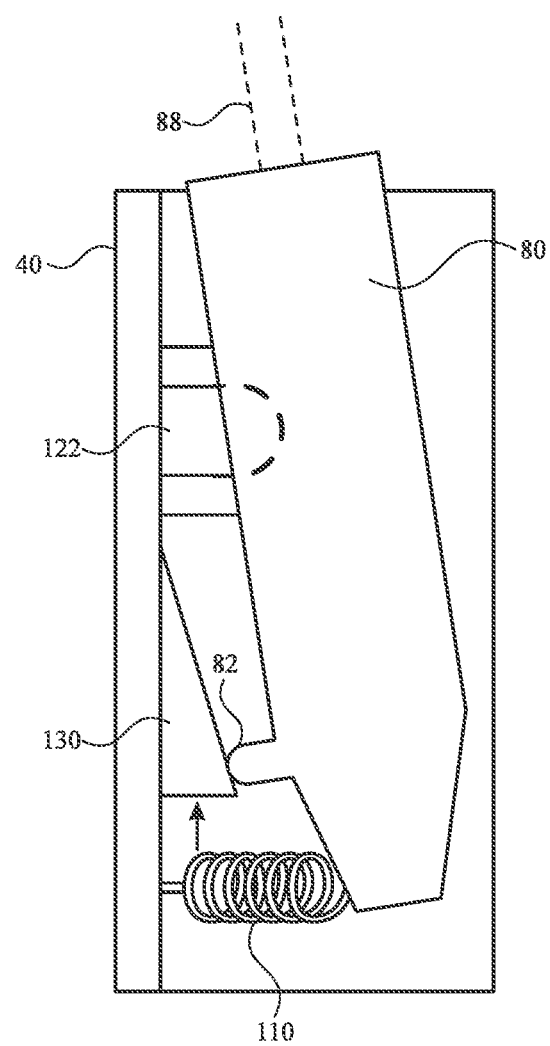
FIG. 6 illustrates another top view of the optical assembly of FIG. 4, according to some embodiments of the present disclosure.

Referring now to FIGS. 5 and 6, the movement of a ramp member 130 can be used to adjust the orientation of the display element 80. For example, as shown in FIG. 5, while the ramp member 130 is in a first position, a first portion of the ramp member 130 can abut an engagement portion 82 of the display element 80. The spring element 110 can facilitate such contact by biasing (e.g., in tension in FIG. 5) the display element 80 toward the ramp member 130 such that the engagement portion 82 abuts the first portion of the ramp member 130. In such a configuration, the display element 80 can project a beam of light 88 in a first direction toward a waveguide.

Detection of the direction of the light can be performed based on the appearance of the light relative to a target element, as discussed herein. For example, an operator, an external device, and/or the processor of the head-mountable device can detect (e.g., via the sensor) whether and by what margin the light 88 is offset from a target element that indicates optimal alignment of the display element 80 relative to the waveguide. Based on this detection, a proposed adjustment can be determined to achieve a desired alignment.

As shown in FIG. 6, the ramp member 130 can be moved to a second position. While the ramp member 130 is and the second position, a second portion of the ramp member 130 can abut the engagement portion 82 of the display element 80. The spring element 110 can continue to facilitate such contact by continuing to bias the display element 80 toward the ramp member 130 such that the engagement portion 82 abuts the second portion of the ramp member 130. In such a configuration, the display element 80 can project the beam of light 88 and a second direction towards the waveguide.

In some embodiments, the display element 80 can be fixed in a given position and/or orientation upon achieving a desired alignment. For example, the display element 80 can be fixedly coupled (e.g., bonded) to the arm 40 or another component of the head-mountable device. Such a coupling and/or bond can include any secure mechanism, including but not limited to adhesive, welds, interference fits, fasteners, and/or combinations thereof. Such a coupling and/or bond can be persistent, such that the display element 80 is fixed in a given position and/or orientation during further assembly, operation, and usage of the head-mountable device.

Additionally or alternatively, the display element 80 can be maintained in a given position and/or orientation without being fixedly coupled (e.g., bonded) to the arm 40 or another component of the head-mountable device. For example, the above-referenced operations (detections and/or adjustments) can be performed repeatedly and/or periodically. By further example, detections and/or adjustments can performed by operation of the processor, the sensor, and/or the actuator. The display element 80 may be forced out of alignment with the waveguide during use (e.g., via deformation of components). In response, the components of the head-mountable device can perform detections and/or adjustments as needed to restore and maintain alignment. Such operations can be performed based on a schedule, a detected condition, and/or a user-initiated command.

Figure 7:
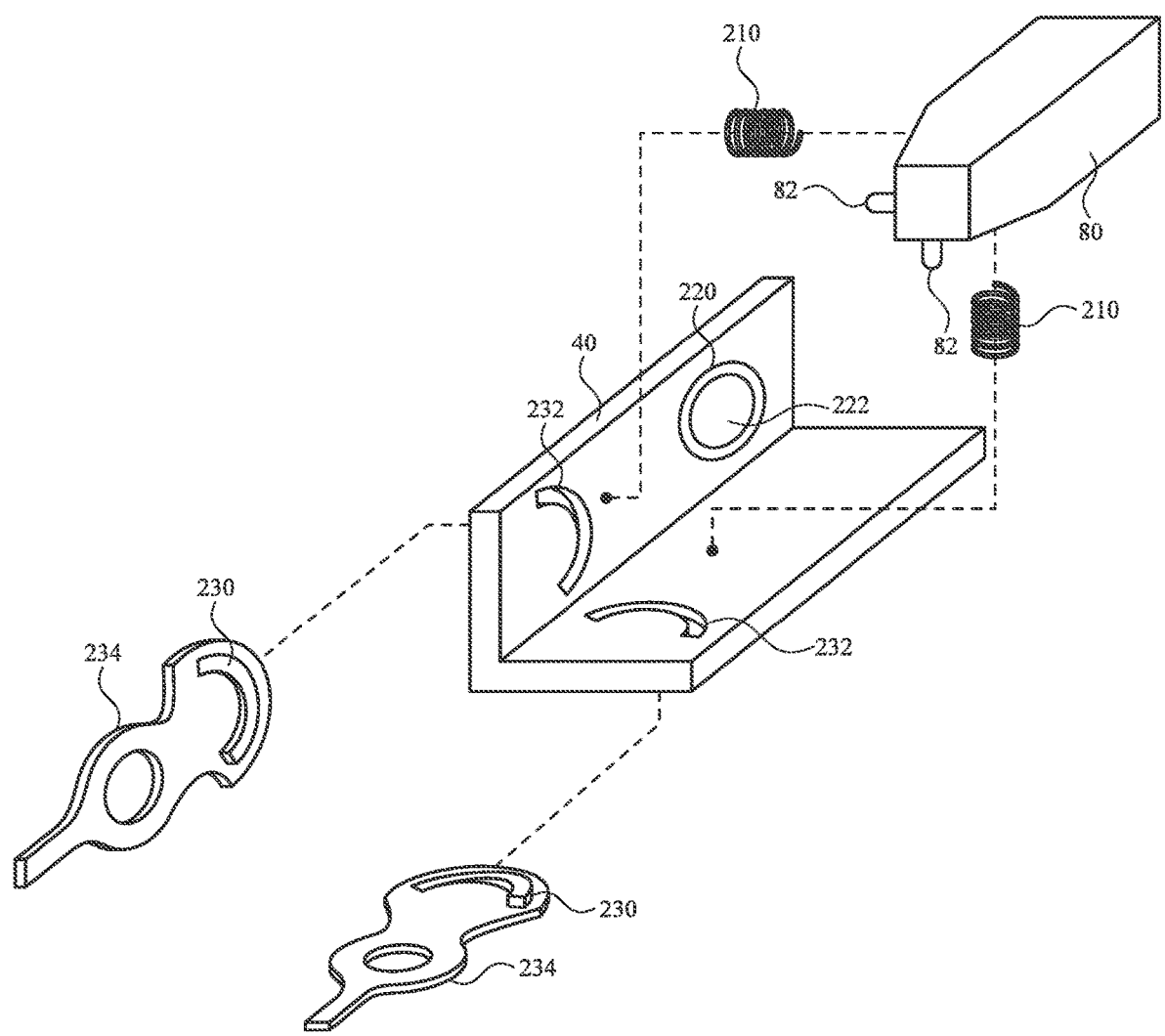
FIG. 7 illustrates an exploded perspective view of an optical assembly of a head-mountable device, according to some embodiments of the present disclosure.

Referring now to FIG. 7, another adjustment mechanism is illustrated for controlling an orientation of a display element within the head mountable device, thereby controlling the direction of a beam of projected light output by the display element.

As shown in FIG. 7, the display element 80 can be coupled to the arm 40 or another structure by a joint 222 that provides rotational movement of the display element 80. For example, the joint 222 can be or include a ball joint that allows the display element 80 to rotate with one or more (e.g., at least two) degrees of freedom while supporting at least a portion of the display element 80 in a given position. The joint 222 can engage the display element 80 with a support structure 220 that can optionally be provided to enhance engagement between the joint 222 and the display element 80.

The display element 80 can be engaged by one or more adjustment members 234 each having one or more ramp members 230. The adjustment members 234 can rotate relative to the arm 40 to urge a portion of the display element 80 and adjust its orientation. For example, each of the ramp members 230 can extend through and slide within a rotary track 232 that forms an arc. By rotating the adjustment members 234, different portions of the corresponding ramp members 230 may contact the display element 80 (e.g., at the engagement portions 82), thereby urging it to a particular orientation, as discussed further herein. Each of the adjustment members 234 can be rotated or otherwise operated independently or in unison. Such operation can be manually, by an external device, and/or by a corresponding actuator that is integrated into the head-mountable device (e.g., within the cavity of the arm 40).

Movement of each of the adjustment members 234 can urge the display element 80 to rotate about a different axis. For example, the axes of rotation can be through the same portion of the display element 80. By further example, the axes of rotation can be orthogonal to each other. At least one of the axes of rotation can optionally be through the joint 222. The axes of rotation of the display element 80 need not be coaxial or otherwise related to the axes about which the adjustment members 234 rotate.

The display element 80 can be biased against the one or more ramp members 230 by one or more spring elements 210. Each of the spring elements 210 can couple the display element 80 to the arm 40 and/or another structure. While the spring elements 210 of FIG. 7 are shown between the display element 80 in the arm 40, it will be understood that the spring elements 210 can be provided at any position and have any type of bias to urge the display element 80 as desired. For example, the spring elements 210 can include a compression spring, an extension spring, a torsion spring, a constant force spring, and the like. While one spring element 210 is shown for each adjustment member 234, it will be understood that any number of spring elements 210 can be provided.

The operations described above with respect to ramp members 130 can be applied to achieve a desired alignment by operation of the adjustment members 234.

Accordingly, embodiments of the present disclosure provide a head-mountable device that provides adjustment mechanisms to achieve optimal alignment of optical components during and/or after assembly thereof within the head-mountable device. The alignment mechanisms can be integrated into the head-mountable device itself. A light projecting display element can be adjustable based on movement of ramp members within the head-mountable device (e.g., within an arm) to adjust an orientation of the light projecting display element relative to the waveguide onto which it projects light. Alignment can be verified based on the optical output of the display element. The adjustment mechanisms can adjust the display element during initial assembly and/or be operated by actuators that actively adjust the alignment as needed over time.

Various examples of aspects of the disclosure are described below as clauses for convenience. These are provided as examples, and do not limit the subject technology.

Clause A: a head-mountable device comprising: a frame; an arm extending from the frame; a waveguide positioned within the frame; a display element positioned within and rotatably coupled to the arm and configured to project light to the waveguide; and a ramp element within the arm and being configured to move against an engagement portion of the display element such that an orientation of the display element relative to the waveguide is adjusted and the light projected from the display element is directed to a target region of the waveguide.

Clause B: a head-mountable device comprising: a frame; an arm extending from the frame; a waveguide positioned within the frame; a target element within the frame; a display element positioned within and coupled to the arm and configured to project light to the waveguide and the target element; a sensor configured to detect a location of the light with respect to the target element; and an actuator within the arm and configured to adjust an orientation of the display element relative to the waveguide based on the sensor and until the light projected from the display element is directed to the target element.

Clause C: a method comprising: projecting light from a display element within an arm of a head-mountable device and onto a waveguide within a frame of the head-mountable device; detect a location of the light with respect to a target element within the frame; and adjusting the display element with a ramp element configured to move within the arm and adjust an orientation of the display element relative to the waveguide such that the light projected from the display element is directed to the target element.

One or more of the above clauses can include one or more of the features described below. It is noted that any of the following clauses may be combined in any combination with each other, and placed into a respective independent clause, e.g., Clause A, B, or C.

Clause 1: the ramp element is configured to move along a track to shift the engagement portion of the display element and adjust the orientation of the display element.

Clause 2: the ramp element is a component of an adjustment member that is configured to rotate relative to the display element to shift the engagement portion of the display element and adjust the orientation of the display element.

Clause 3: a spring element that biases the engagement portion of the display element against the ramp element.

Clause 4: the display element is rotatably coupled to the arm with a joint providing at least two degrees of freedom.

Clause 5: the ramp element is a first ramp element configured to move such that the display element rotates about a first axis; and the head-mountable device further comprises a second ramp element configured to move such that the display element rotates about a second axis.

Clause 6: a first lens; and a second lens, wherein the waveguide is positioned between the first lens and the second lens.

Clause 7: a target element within the frame.

Clause 8: a sensor configured to detect a location of the light with respect to the target element.

Clause 9: an actuator within the arm and configured to move the ramp element until the light projected from the display element is directed to the target element.

Clause 10: a processor operatively connected to the display element, the sensor, and the actuator.

Clause 11: a ramp element within the arm, wherein the actuator is configured to move the ramp element against an engagement portion of the display element such that the orientation of the display element relative to the waveguide is adjusted and the light projected from the display element is directed to the target element.

Clause 12: the actuator is a first actuator configured to rotate the display element about a first axis; and the head-mountable device further comprises a second actuator configured to rotate the display element about a second axis.

Clause 13: fixedly coupling the display element to the arm such that the orientation of the display element with respect to the arm is secured.

Clause 14: adjusting the display element comprises operating an actuator of the head-mountable device to rotate the display element by moving the ramp element.

Clause 15: determining the location of the light with respect to the target element comprises operating a sensor of the head-mountable device to visually identify the light and the target element.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
 a frame;
 an arm extending from the frame;
 a waveguide positioned within the frame;
 a display element positioned within and rotatably coupled to the arm and configured to project light to the waveguide; and
 a ramp element within the arm and being configured to move against an engagement portion of the display element such that an orientation of the display element relative to the waveguide is adjusted and the light projected from the display element is directed to a target region of the waveguide.

2. The head-mountable device of claim 1, wherein the ramp element is configured to move along a track to shift the engagement portion of the display element and adjust the orientation of the display element.

3. The head-mountable device of claim 1, wherein the ramp element is a component of an adjustment member that is configured to rotate relative to the display element to shift the engagement portion of the display element and adjust the orientation of the display element.

4. The head-mountable device of claim 1, further comprising a spring element that biases the engagement portion of the display element against the ramp element.

5. The head-mountable device of claim 1, wherein the display element is rotatably coupled to the arm with a joint providing at least two degrees of freedom.

6. The head-mountable device of claim 1, wherein:
 the ramp element is a first ramp element configured to move such that the display element rotates about a first axis; and
 the head-mountable device further comprises a second ramp element configured to move such that the display element rotates about a second axis.

7. The head-mountable device of claim 1, further comprising:
 a first lens; and
 a second lens, wherein the waveguide is positioned between the first lens and the second lens.

8. The head-mountable device of claim 1, further comprising a target element within the frame.

9. The head-mountable device of claim 8, further comprising a sensor configured to detect a location of the light with respect to the target element.

10. The head-mountable device of claim 9, further comprising an actuator within the arm and configured to move the ramp element until the light projected from the display element is directed to the target element.

11. The head-mountable device of claim 10, further comprising a processor operatively connected to the display element, the sensor, and the actuator.

12. A head-mountable device comprising:
 a frame;
 an arm extending from the frame;
 a waveguide positioned within the frame;
 a target element within the frame;
 a display element positioned within and coupled to the arm and configured to project light to the waveguide and the target element;
 a sensor configured to detect a location of the light with respect to the target element; and
 an actuator within the arm and configured to adjust an orientation of the display element relative to the waveguide based on the sensor and until the light projected from the display element is directed to the target element.

13. The head-mountable device of claim 12, further comprising a ramp element within the arm, wherein the actuator is configured to move the ramp element against an engagement portion of the display element such that the orientation of the display element relative to the waveguide is adjusted and the light projected from the display element is directed to the target element.

14. The head-mountable device of claim 12, wherein:
 the actuator is a first actuator configured to rotate the display element about a first axis; and
 the head-mountable device further comprises a second actuator configured to rotate the display element about a second axis.

15. The head-mountable device of claim 12, further comprising:
 a first lens; and
 a second lens, wherein the waveguide is positioned between the first lens and the second lens.

16. The head-mountable device of claim 12, further comprising a processor operatively connected to the display element, the sensor, and the actuator.

17. A method comprising:
 projecting light from a display element within an arm of a head-mountable device and onto a waveguide within a frame of the head-mountable device;
 detecting a location of the light with respect to a target element within the frame; and
 adjusting the display element with a ramp element configured to move within the arm and adjust an orientation of the display element relative to the waveguide such that the light projected from the display element is directed to the target element.

18. The method of claim 17, further comprising fixedly coupling the display element to the arm such that the orientation of the display element with respect to the arm is secured.

19. The method of claim 17, wherein the adjusting the display element comprises operating an actuator of the head-mountable device to rotate the display element by moving the ramp element.

20. The method of claim 17, wherein the detecting determining the location of the light with respect to the target element comprises operating a sensor of the head-mountable device to visually identify the light and the target element.

* * * * *

UNITED STATES PATENT AND TRADEMARK OFFICE
CERTIFICATE OF CORRECTION

| | |
|---|---|
| PATENT NO. | : 11,726,335 B2 |
| APPLICATION NO. | : 16/908549 |
| DATED | : August 15, 2023 |
| INVENTOR(S) | : Cameron A. Harder et al. |

It is certified that error appears in the above-identified patent and that said Letters Patent is hereby corrected as shown below:

In the Claims

Column 19, Lines 9-10 (Claim 20):
"the detecting determining the"
Should read:
--the detecting the--

Signed and Sealed this
Twenty-third Day of January, 2024

Katherine Kelly Vidal
*Director of the United States Patent and Trademark Office*